United States Patent [19]

Blume

[11] Patent Number: 5,345,965
[45] Date of Patent: Sep. 13, 1994

[54] VALVE BODY DESIGN FOR USE WITH PUMPS HANDLING ABRASIVE FLUIDS

[76] Inventor: George H. Blume, 107 Morning Cloud Cove, Austin, Tex. 78734

[21] Appl. No.: 65,641

[22] Filed: May 21, 1993

[51] Int. Cl.⁵ ............................................. F16K 15/06
[52] U.S. Cl. ........................ 137/533.25; 137/516.29; 137/902; 251/368
[58] Field of Search ......... 137/516.29, 533.21–533.31, 137/542, 543, 902; 251/368

[56] References Cited

U.S. PATENT DOCUMENTS

| | | | |
|---|---|---|---|
| 2,903,235 | 9/1959 | Rodgers | 137/533.25 |
| 4,140,148 | 2/1979 | Richter | 137/516.29 X |
| 4,194,527 | 3/1980 | Schonwald | 137/543 |
| 4,860,995 | 8/1989 | Rogers | 137/516.29 |
| 5,062,452 | 11/1991 | Johnson . | |
| 5,176,170 | 1/1993 | Boyesen | 137/855 X |

OTHER PUBLICATIONS

"Kevlar Wearforce Composites" Brochure (date unknown).
"Valves & Seats" Brochure, Harrisburg, Inc. (1989).

Primary Examiner—Robert G. Nilson
Attorney, Agent, or Firm—Gambrell Wilson & Hamilton

[57] ABSTRACT

An improved plastic valve body design and construction which has strength and durability similar to that of steel valve bodies but with significantly reduced manufacturing time and cost. The valve body comprises a unique and nonobvious combination of a previously unused plastic material and a complex rib design that results in performance similar to that of steel valves. The valve body is preferably comprised of a nylon/-Kevlar composite material. A plurality of ribbed members connect outer and inner faces of the valve body to provide increased strength and durability. The plastic valve body has the ability to deform to mate with the valve seat and thus extrusion gaps are eliminated. This allows use of more desirable softer polyurethane inserts.

11 Claims, 2 Drawing Sheets

VALVE BODY DESIGN FOR USE WITH PUMPS HANDLING ABRASIVE FLUIDS

FIELD OF THE INVENTION

The present invention relates generally to valves used in pumps handling abrasive fluids. More specifically, the present invention comprises a plastic valve body design which provides results equal to or greater than steel valves with significantly reduced cost and manufacturing time.

BACKGROUND OF THE INVENTION

Pumping systems which are used to pump drilling mud and other abrasive fluids generally incorporate positive displacement pistons or plungers which operate in a reciprocating manner in individual cylinders. Each piston or plunger cylinder has a suction and discharge valve and valve seat operating alternatingly and independently to control flow into and out of each cylinder. The valve typically comprises a disc-shaped body portion which includes an elastomeric valve insert which serves to seal the valve when in the closed position and also serves to cushion the impact of the valve body in the valve seat. The lower conical seating surface of the valve body also makes contact with the valve seat when the valve is in the closed position.

Early prior art valve assembly designs included a steel valve body and steel valve seat that were both heat treated to increase wear resistance. However, heat treating usually caused warpage in the sealing surface, and thus a rubber insert was typically used to help seal between irregular warped steel valve bodies and the valve seat surfaces. The rubber insert also helped to seal around solid particles in the mud that were trapped between the valve seat. These valves provided acceptable performance at low pressures, but the rubber insert failed frequently due to extrusion and abrasion damage. The insert generally required replacement up to 10 times over the life of the steel valve body and steel valve seat.

Later, circa 1965, a new valve assembly design referred to as the TRW Mission Design was introduced. This design incorporated a 4-web carburized valve seat that became an industry standard. The design also incorporated an elastomer insert on the valve body. The elastomer insert was manufactured from a polyurethane material having a 90-shore A durometer hardness, a high strength modulus, and excellent abrasion and extrusion resistance compared to prior rubber inserts. Use of polyurethane inserts raised the effective valve pressure rating of the valve assembly. These valve assemblies required less frequent changing of inserts, and the 90-shore A durometer hardness also became an industry standard. The few disadvantages to these polyurethane inserts were that the hard 90-shore A material had a very low resilience, provided poor sealability in worn valve seats and/or unprimed pumps, and had less abrasion resistance compared to softer polyurethanes. An example of a metal valve body having an elastomeric seal is described in U.S. Pat. No. 4,860,995 to Rogers.

Because of the above disadvantages of harder polyurethane, such as the 90-shore A durometer, engineers would have preferred using a softer polyurethane. However, this was not possible because, concurrent with this design, average drilling pressures increased due to ever deeper drilling. Also this design introduced heat treatment by carburizing a process that increased steel hardness and wear resistance, but also increased warpage. The harder polyurethane was also necessary because of the increased warpage of the steel valve bodies during the heat treat carburizing manufacturing process. This warpage resulted in extrusion gaps between the mating valve body and valve seat which has caused premature failure of softer polyurethanes.

Pumping systems which are used to pump abrasive fluids undergo tremendous pressure and valve bodies and seats therefore suffer impact and stress high wear. One of the most significant points of impact stress in the valve assembly is the point of contact of the valve body and the valve seat when the valve is in the fully closed position. The extremely high differential pressures in the valve cause the valve body to engage the valve seat with a very high impact. The repetitive impact eventually causes the valve body to become worn and fatigued, necessitating its replacement. Because of high pump pressures (between 1000 and 5000 psi) and the abrasive solid particles suspended in the drilling mud, prior art valve bodies and valve seats were required to be constructed of steel that was both heat treated and carburized to increase durability.

However, the manufacture of steel valve assemblies is generally a lengthy and expensive process. First, it is necessary to procure raw material in the form of forgings or castings, which then must be machined and heat treated. In many instances, it is then necessary to again machine these elements and, in some designs, further heat treat them. The length of time required for the total manufacturing operation is generally six months or more. The manufacturing cost is also considerable.

Although various types of plastic materials have been available for years or even decades, the industry has generally taught against the use of plastic valve bodies in high pressure applications because of the assumption that plastic lacked the strength and durability at these pressures. The few attempts to design a plastic valve for high pressure applications have failed. For example, U.S. Pat. No. 5,062,452 to Johnson discloses a valve member comprising a lower support portion and an upper seal portion. The support portion is made of a relatively rigid plastic, a hard cast polyurethane, and the seal portion is made of a relatively soft plastic, a softer grade of polyurethane. The Johnson patent mentions both oil well and water well applications for this valve. However, testing has proven that this valve is unusable in oil well applications.

One problem in using urethane as taught in Johnson is that these plastics generally lack rigidity. Further, these plastics are temperature sensitive and lose what rigidity they have very quickly as temperature increases. As a result, the valves described in the Johnson patent fail at high pressures, and thus can only be used in very low pressure applications. In addition, Johnson teaches that the valve member is made of cast urethane using an open molded process. This process is very labor and time intensive and thus considerably increases the cost of the assembly.

Thus, there has been a long-felt need for a new valve body design with strength and durability similar to that of steel valves but with reduced manufacturing time and cost. Also, there has been a long-felt need for a valve body design which allows use of more desirable softer polyurethane inserts for improved sealability, resilience and abrasion resistance.

SUMMARY OF THE INVENTION

The present invention comprises a plastic valve body design and construction which has strength and durability similar to that of steel valve bodies but with significantly reduced manufacturing time and cost. The valve body design of the present invention comprises a unique and unobvious combination of a previously unused plastic material in this application and a complex rib design that results in performance similar to that of steel valves.

In one embodiment of the invention, the valve is comprised of material referred to as Delrin ® (acetate). In the preferred embodiment, the valve of the present invention is formed of a plastic/nylon and Kevlar ® (aramid) composite material that heretofore has not been used in valve design and results in unexpected performance. The plastic material allows large deflection under load, particularly in the material immediately adjacent to the impact bearing area with the valve seat. The remaining section of the valve body remains rigid and stiff to prevent structural failure of the complete valve body.

The ability of the plastic material to deflect and plastically deform results in reduced impact stress and wear. This ability to deform to the mating valve seat essentially eliminates extrusion gaps and allows use of more desirable softer polyurethane inserts, which is not possible with steel valve bodies. The rib design of the present invention provides a high sectional modulus and moment of inertia for overall design stiffness and strength. Both materials are injection moldable, which allow short manufacturing time cycles and low cost. Thus, the plastic valve design of the present invention provides results similar to that of steel valves but with considerably less manufacturing time and cost.

DETAILED DESCRIPTION OF THE PREFERRED EMBODIMENT

Figure 1:
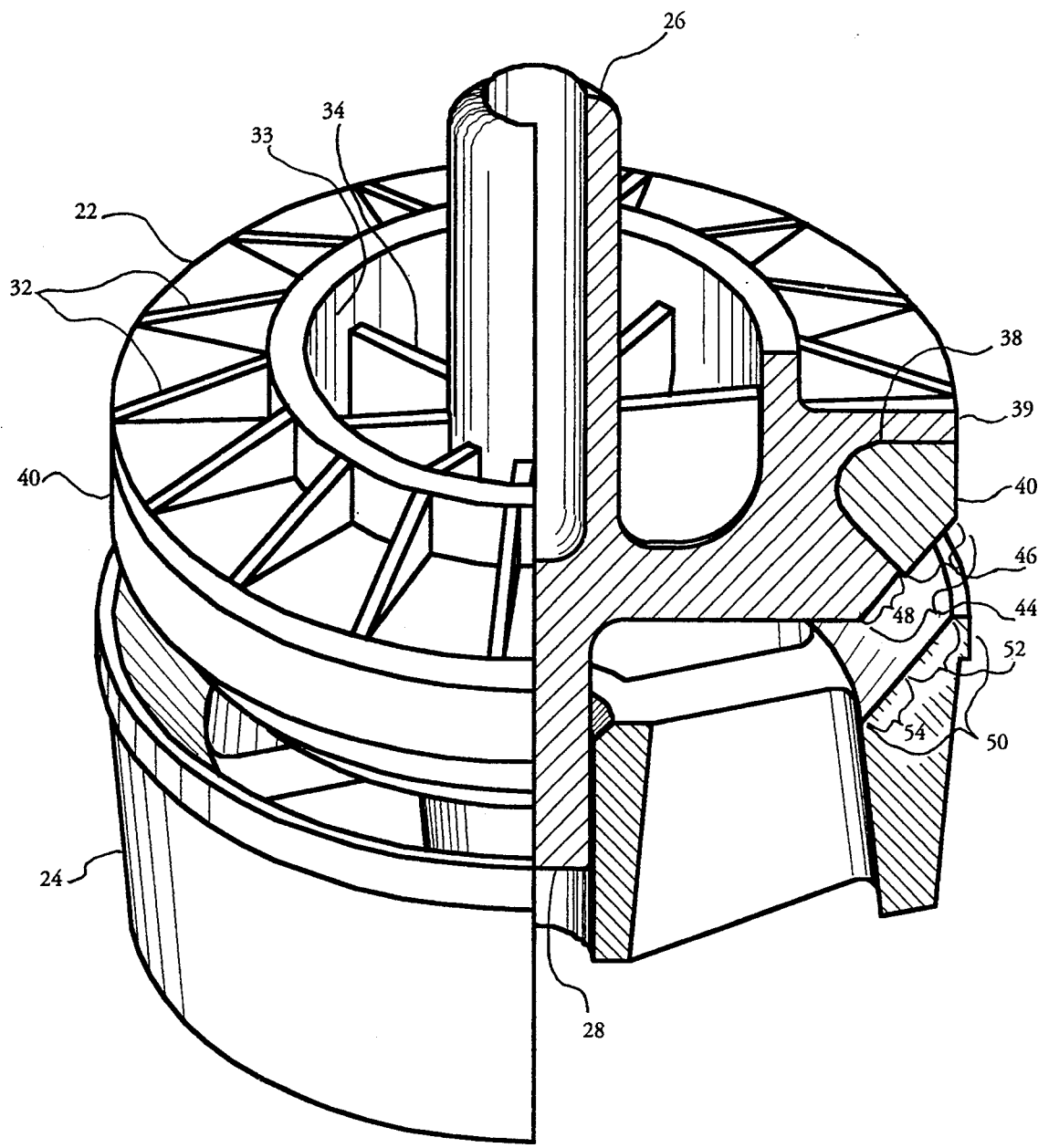
FIG. 1 is a perspective view of a mud pump valve assembly comprising a valve seat and a valve body according to the present invention.
Figure 2:
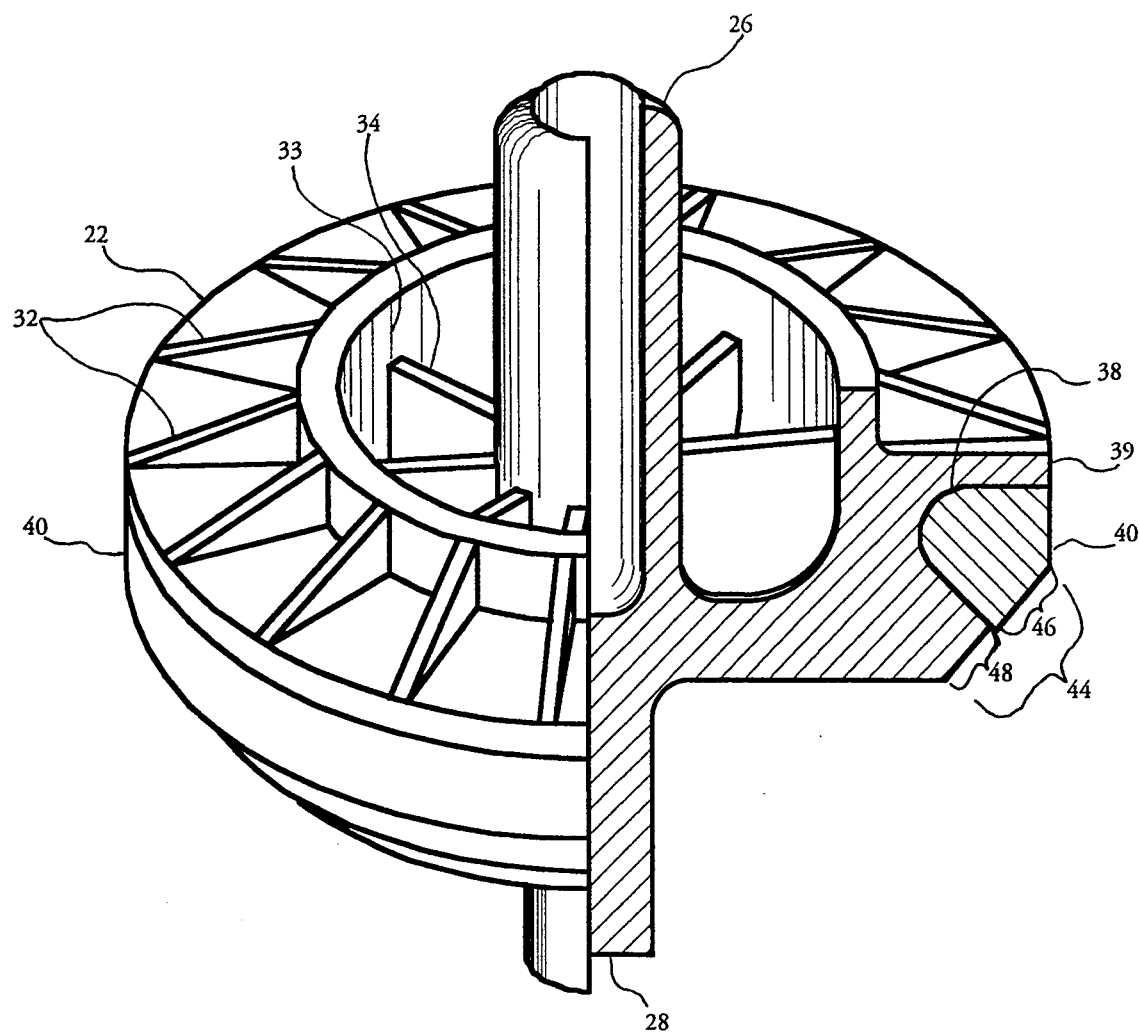
FIG. 2 is a perspective view of the valve body of the present invention.

FIG. 1 is a perspective view of a mud pump valve assembly comprised of a valve body 22 according to the present invention and a valve seat 24 as shown. FIG. 2 illustrates the valve body 22 by itself. For purposes of simplicity, the valve body 22 in FIG. 1 is discussed, with discussion applying equally well to the valve body in FIG. 2.

Referring to FIG. 1, the valve assembly is shown in the full open position. The valve body 22 is preferably comprised either of a plastic nylon/Kevlar ® composite material or of Delrin ® and includes a complex rib design according to the present invention. The valve seat 24 is preferably comprised of carburized steel.

The valve body 22 comprises an upper valve guide 26 which maintains proper registration of the valve body 22 within the pump housing (not shown). A lower valve guide 28 serves to maintain proper alignment of the valve body 22 with respect to the valve seat 24. The valve body 22 is generally disc-shaped and includes a complex rib design comprised of a plurality of ribbed members 32 according to the present invention. This rib design is discussed further below. The outer portion of the disc-shaped valve body 22 has a generally C-shaped cross-section with an annular groove 38 being defined by interior 33 of the C-shaped portion. A plurality of second ribbed members 34 connect interior 33 of the C-shaped portion to the upper and lower valve guides 26 and 28.

A polyurethane insert 40 is received in the annular groove 38. The valve body 20 includes an upper lip 39 which retains the sealing insert 40. Whereas, prior art steel valve bodies require a harder (90-shore A durometer) polyurethane insert due to the carburized steel's inability to deform, the plastic valve body 22 of the present invention uses a softer 70-shore A durometer polyurethane insert material. This is made possible due to the plastic material's ability to permanently deform and essentially eliminate extrusion gaps between the valve body 22 and valve seat 24. As previously noted, a softer polyurethane is preferable because of its high resilience and improved sealability. This ability to use a softer polyurethane insert made possible by the plastic valve body design of the present invention was an unexpected benefit that is not taught or suggested in the prior art.

The insert 40 serves to provide a partial damping of the impact of the valve body 22 against the valve seat 24. However, this impact as in most prior art systems is still high enough to cause significant wear on the operating faces of the valve body 22 and the valve seat 24. The lower portion of the valve body 22 has a somewhat conical cross-section with a sloped surface illustrated by reference numeral 44. The sloped surface 44 comprises a urethane portion illustrated by reference numeral 46 and a plastic portion illustrated by reference numeral 48.

The valve seat 24 is preferably formed of carburized steel and comprises a seating surface 50 with a portion 52 which engages the urethane portion 46 of the valve body surface and a portion 54 which engages the plastic portion 48 of the valve body surface. For more information on the operation of this valve, please see U.S. application Ser. No. 07/815,176, now U.S. Pat. No. 5,249,600, which is hereby incorporated by reference.

In one embodiment of the invention, the valve body 22 is comprised of a plastic material referred to as Delrin ®, which is available from DuPont Corporation. Delrin ® is preferably used in low pressure applications to reduce cost and manufacturing time. In higher pressure applications, a valve assembly comprised of Delrin ® provides a short service life due to high wear in the Delrin ® material. However, structural failure has not been encountered using Delrin valve bodies in low pressure applications.

In the preferred embodiment, the valve body 22 is comprised of a nylon/Kevlar ® (aramid) composite material. In the preferred embodiment, the valve body 22 is comprised of a blend of 50% DuPont Wear Force TM plus 50% nylon 66. DuPont Wear Force TM is itself comprised of 35% Kevlar fiber and 65% Nylon 66. Kevlar ® is a material produced by and available from DuPont. Thus, the final composition of the valve body 22 in the preferred embodiment is 17.5% Kevlar and 82.5% Nylon 66. Of course, other percentage combinations of these materials may also be used to optimize performance versus raw material cost.

Even though many types of plastic materials have been around for years or even decades, including the materials referenced above, plastic has not been used in valves designed for high pressure applications. Those in the industry have generally believed that a plastic valve assembly would lack sufficient strength in drilling mud pump applications. In fact, Applicant encountered difficulty in attempting to test this valve because many oilfield drilling contractors in the industry would not believe that a plastic valve could withstand such pressures. Therefore, the art has generally taught away from the use of plastic materials for valves in drilling mud pump and other high pressure applications.

The valve body 22 of the present invention is designed using a plastic material to reduce cost and manufacturing lead time. The valve body 22 is manufactured using an injection molded process, which accomplishes the above goals. One drawback to injection molding is that it tends to limit the maximum cross-section of thickness and strength of the valve body 22. However, this limitation was overcome by a novel rib design according to the present invention which reduces localized thickness and reduces the material cost. The rib design increases the sectional modulus and stiffness of the valve body 22 and provides increased strength and durability to the valve body 22 that rivals or surpasses that of steel valves.

In general, wear in the bearing surface of a valve is directly proportional to the impact stress on the bearing area of the valve. Impact stress "$\sigma$," which is reduced by the increased flexibility of the design of the present invention, is calculated using the follow formula:

$$\sigma = \sigma_s \left( 1 + \sqrt{1 + \frac{2h}{y}} \right)$$

where: $\sigma_s$=stress resulting when the seat bearing load, due to pump pressure forcing the valve against the seat, is applied statically;

h=distance the valve, under load from pump pressure travels before impact with the seat; and y=deflection resulting from the static seat load as a result of pump pressure forcing the valve against the seat.

Because of the non-axisymetrical seat bearing loads and the ribbed design of the present invention, complex computer finite element analysis is necessary to determine the values of "$\sigma_s$" and "y." Utilizing computer finite element stress analysis it has been calculated that "y" is increased by a factor of 11 to 1 for this design manufactured with an injection molded plastic material; furthermore, "$\sigma_s$" is reduced by 50% in the localized areas of impact. Additionally "h" is reduced 50% in the present invention. A lower value of "h" is acceptable for this design because the plastic material deforms to mate with the irregular seat surface, which is comprised of steel and generally is warped by carburization. As a consequence, less insert interference is necessary to assure proper sealability of the valve insert; thus "h" is similarly reduced. Utilizing the above calculated values, impact stress "$\sigma$+ is calculated to be reduced by up to 90% for this design.

Despite this reduction, at higher pump pressures the impact stress on the valve of this invention still exceeds the tensile strength of the nylon/Kevlar ® (aramid) composite material. However, after break-in of the valve in initial pump service, the nylon particles on the surface of the valve are either worn away or compacted into the remaining material. A high concentration of the Kevlar fibers are then exposed to impact from the seat bearing loads. Because Kevlar has a very high tensile strength, greater than steel, the wear slows significantly after the initial break-in period. This hypothesis has been verified by field tests of the design.

Thus, this plastic valve design is a unique combination of a complex rib design with a plastic material that results in unexpected performance. The plastic material of the present invention allows large deflection under load, particularly in the material immediately adjacent to the impact bearing area with the valve seat 24. The ability of the plastic material to deflect and plastically deform results in reduced impact stress and wear. This ability to deform to the mating valve seat essentially eliminates extrusion gaps and thus allows use of softer polyurethane inserts. In addition, the deflection of the plastic material is most significant in the localized area of impact. Further, the novel rib design of the present invention results in high sectional modulus and moment of inertia for overall design stiffness and strength.

Therefore, the plastic valve composition and complex rib design of the present invention provide a valve body with a strength and durability equal to or greater than that of steel valve bodies with considerably reduced manufacturing time and manufacturing cost. Also, this design allows use of softer polyurethane inserts which add improved sealability, resilience, and abrasion resistance.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. An improved valve body in a valve assembly for use in high pressure pumping applications, said valve body comprising:
    a disc-shaped body comprised of a combination of Kevlar ® and nylon material and having a plurality of ribbed members which provide increased durability and wear resistance.

2. The valve body according to claim 1, said disc-shaped body having an outer portion and an inner portion, wherein said plurality of ribbed members are connected between said outer and inner portions.

3. The valve body according to claim 1, wherein said valve body is comprised of between 5% and 50% Kevlar ® and 50% and 95% nylon.

4. An improved valve body in a valve assembly for use in high pressure pumping applications, said valve body comprising:
    an upper valve guide;
    a lower valve guide which maintains alignment of the valve body with a valve seat; and
    a disc-shaped body having an outer portion for engaging a complementary portion of a valve seat, and an inner portion which is connected to said upper and lower valve guides, wherein said plurality of ribbed members are connected between said outer and inner portions to provide increased durability and wear resistance
    wherein said valve body is comprised of a combination of Kevlar ® and nylon material.

5. An improved valve body in a valve assembly for use in high pressure pumping applications, said valve body being comprised of a combination of Kevlar ® and nylon material and comprising an elastomer insert for engaging a complementary portion of a valve seat, wherein said elastomer is comprised of a soft polyurethane material.

6. The valve body according to claim 5, wherein said elastomer insert is comprised of a polyurethane material having a 75 shore-A durometer or less hardness.

7. An improved valve body in a valve assembly for use in high pressure pumping applications, said valve body comprising approximately 17.5% Kevlar ® and approximately 82.5% nylon material.

8. An improved valve assembly for use in high pressure pumping applications, comprising:
 a valve seat; and
 a valve body comprising a disc-shaped body having a plurality of ribbed members which provide increased durability and wear resistance, a portion of said valve body being for engaging a complementary portion of said valve seat, wherein said valve body is comprised of a combination of Kevlar ® and nylon material.

9. The valve assembly according to claim 8, said disc-shaped body having an outer portion and an inner portion, wherein said plurality of ribbed members are connected between said outer and inner portions.

10. An improved valve assembly for use in high pressure pumping applications, comprising:
 a valve seat; and
 a valve body comprising a portion for engaging a complementary portion of said valve seat, an upper valve guide, a lower valve guide which maintains alignment of the valve body with said valve seat, and a disc-shaped body having an outer portion which comprises said portion for engaging a complementary portion of a valve seat, an inner portion which is connected to said upper and lower valve guides, and a plurality of ribbed members connected between said outer and inner portions to provide increased durability and wear resistance, wherein said valve body is comprised of a combination of Kevlar ® and nylon material.

11. An improved valve assembly for use in high pressure pumping applications, comprising:
 a valve seat; and
 a valve body comprising a portion for engaging a complementary portion of said valve seat, wherein said valve body is comprised of approximately 17.5% Kevlar ® and 82.5% nylon material.

* * * * *